Aug. 29, 1967  W. T. IRWIN ET AL  3,338,777
FIBERS GLASS MAT AND METHOD OF MAKING SAME
Filed May 11, 1966  2 Sheets-Sheet 1

INVENTORS
WINFIELD T. IRWIN
JOHN H. SEARLES

ATTORNEYS

Aug. 29, 1967    W. T. IRWIN ET AL    3,338,777
FIBERS GLASS MAT AND METHOD OF MAKING SAME
Filed May 11, 1966    2 Sheets-Sheet 2

INVENTORS
WINFIELD T. IRWIN
JOHN H. SEARLES

ATTORNEYS

United States Patent Office 3,338,777
Patented Aug. 29, 1967

3,338,777
FIBER GLASS MAT AND METHOD OF MAKING SAME
Winfield T. Irwin and John H. Searles, Pittsburgh, Pa., assignors to Pittsburgh Plate Glass Company, Pittsburgh, Pa., a corporation of Pennsylvania
Filed May 11, 1966, Ser. No. 549,285
11 Claims. (Cl. 161—154)

This application is a continuation-in-part of our copending application, Ser. No. 295,694, filed July 17, 1963, now abandoned, and entitled, "Fibrous Mat and Method of Manufacturing."

This invention relates to the manufacture of nonwoven fibrous mats and more particularly to new and improved mats utilizing fiber glass filaments having permanently crimped and helical configurations.

In the past, difficulty has been encountered in manufacturing fiber glass mats from straight linear fibers without the use of a resin binder. For certain applications, such as insulating blankets or mats for use at high temperatures, for example, on the order of the softening point of the glass, for example 1200° F., it is not only desirable but necessary to use a mat that does not have an organic binder to bond the fibers into a mat. It has been discovered that by using short segments of permanently deformed, crimped, helically-shaped fiber glass filaments, that it is possible to manufacture a fiber glass mat without an organic binder binding the segments to each other. One method of making the permanently crimped, helically-shaped fiber glass product from which the segments are cut is disclosed in the copending application of Winfield T. Irwin and Warren W. Drummond, Ser. No. 246,889, filed Dec. 26, 1962, and entitled, "Fibrous Product and Process of Making the Same."

The product of the aforesaid application which comprises a tow composed of a plurality of strands relatively movable with respect to one another in all directions is crimped to distort the strand and filaments thereof. The distortion of the strands and filaments is accomplished by heat-set crimping, so that the distortion is permanent. No organic binder is present in the tow.

In addition, it has further been discovered that nonwoven mats made of a blend of organic fibers of synthetic or natural origin and mixtures thereof and the above described crimped and helically-shaped fibers, have improved resiliency and great dimensional stability.

It is a primary object of the present invention to provide nonwoven fibrous mats having high resiliency and dimensional stability.

Another object of this invention is to provide a nonwoven fiber glass mat which is substantially free of organic binders with high dimensional stability.

Other objects and advantages will become apparent as the following description proceeds, taken in conjunction with the appended claims and the accompanying drawings.

Figure 1:
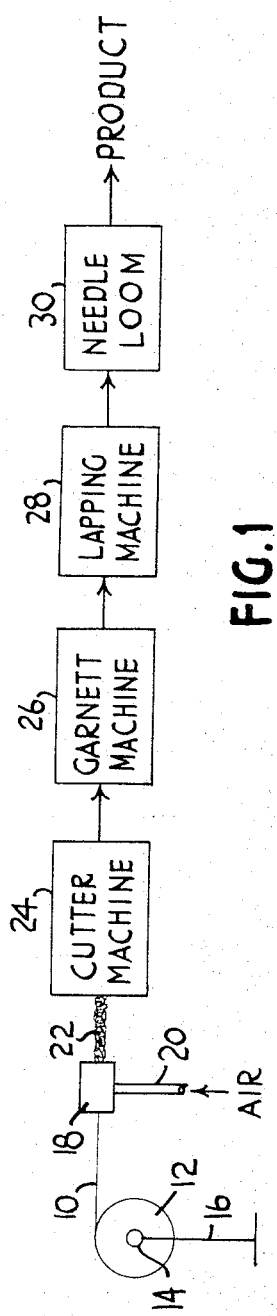
FIG. 1 is a schematic flow diagram of the process for making fiber glass mats without the use of an organic binder.
Figure 5:
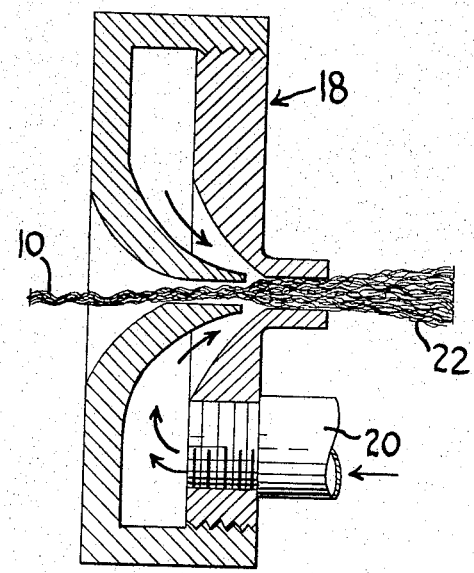
FIG. 5 is an illustration of a segment of yarn crimped and distorted by the apparatus of FIG. 4 and being fed into an air nozzle where it is expanded by air.

Referring to FIG. 1, a crimped tow 10, i.e., a plurality of longitudinally extending crimped fiber glass strands which are relatively movable with respect to each other, the filaments of the strand being distorted and extending in a plurality of directions when substantially free of tension and being intertwined and relatively movable with respect to one another, is unwound from a package 12 positioned on a horizontal spindle 14 that is mounted on a suitable support 16. The crimped tow 10 is threaded through an air nozzle 18. Air from a source enters the air nozzle 18 through a conduit 20 and impinges on the tow 10. The air expands the two into a continuous cylindrical mass of helically-shaped, intertwined fiber glass filaments (see FIG. 5). The density of the expanded tow, designated by the numeral 22, may be on the order of one-five hundredths of the density of the tow before expansion. The bulk of the expanded tow is very high as compared with that of the tow before expansion. The expanded tow, while possessing high bulk and low density, is nevertheless an integrated body because of the intertwining of the permanently crimped filaments therein.

The expanded tow 22 is introduced into a conventional cutter device 24 where the expanded cylindrical mass of crimped, helically-shaped and intertwined fiber glass filaments is severed into segments of a preselected size, as for example, one to four inches in length. Of course other lengths or mixtures of various lengths may be used within the purview of the invention.

The segments are fed from the cutter 24 to a garnett machine 26, of conventional construction, wherein the segments are distributed onto a moving conveyor or chain to form a low density web. The step of air expansion may be dispensed with because the garnett machine 26 is capable of separating the fibers of the tow 10 to filament form after they have been cut to short lengths.

The web, having good fiber distribution because of the filamentary nature of the fibrous material, is conveyed from the garnett machine 26 to a lapping machine 28 where the webs are positioned in overlying, lapped relation. The lapping machine 28 is arranged to build up a mat from successive layers of web to any preselected thickness, as for example, 12 to 18 inches, or more, or less, depending on the ultimate use of the finished product.

The lapped material is then conveyed to a needle loom 30 where a plurality of barbed needles pass through the lapped webs and draw filaments from one layer of the web into adjacent layers to mechanically interlock the layers of web to one another. Because of the crimped configuration of the filaments the needled mat is mechanically strong. In the needle loom 30, the lapped web is reduced in thickness by the needling operation and the thickness of the end product is generally controlled by the number of layers of web placed in overlying relation and the number of needle punches per unit area. The apparatus employed in the process, i.e., the cutter machine 24, the garnett machine 26, the lapping machine 28 and the needle loom 30, are conventional and their construction is well known in the textile art.

The needled, fibrous mat, mechanically interlocked by the above process consists essentially of fiber glass filaments. It is free of any and all organic binders, generally required in fiber glass mats to provide mechanical strength for handling, etc. The end product may dictate the use of anti-static materials or lubricants or the like, but such are not binders and do not function as such. Here, however, the layers of webbed material formed in the garnett machine 26 are mechanically interlocked to each other by the permanently deformed fiber glass filaments extending through adjacent layers of webbed material. The webs themselves are relatively strong because of the deformed configuration of the filaments distributed by the garnett machine. The interlocking of the layers of webbed material is enhanced by the crimped and deformed configuration of the respective fiber glass filaments. These deformed filaments are drawn through adjacent layers by the action of the barbed needles in the needle loom 30 and mechanically interlocked or bond the layers to each other. As will be readily understood straight filaments cannot provide the same degree of interlocking as do the crimped, deformed filaments. Thus, the mechanical strength of the product is superior to that produced using the usual, non-deformed filaments.

Fibrous, binder-free mats, formed by the described process have great dimensional stability and resiliency, as well as mechanical strength. They retain their shape after extended use and are highly useful for applications wherein high temperatures, as for example, as insulation where temperatures upwards to 1200° F. are encountered.

Figure 2:
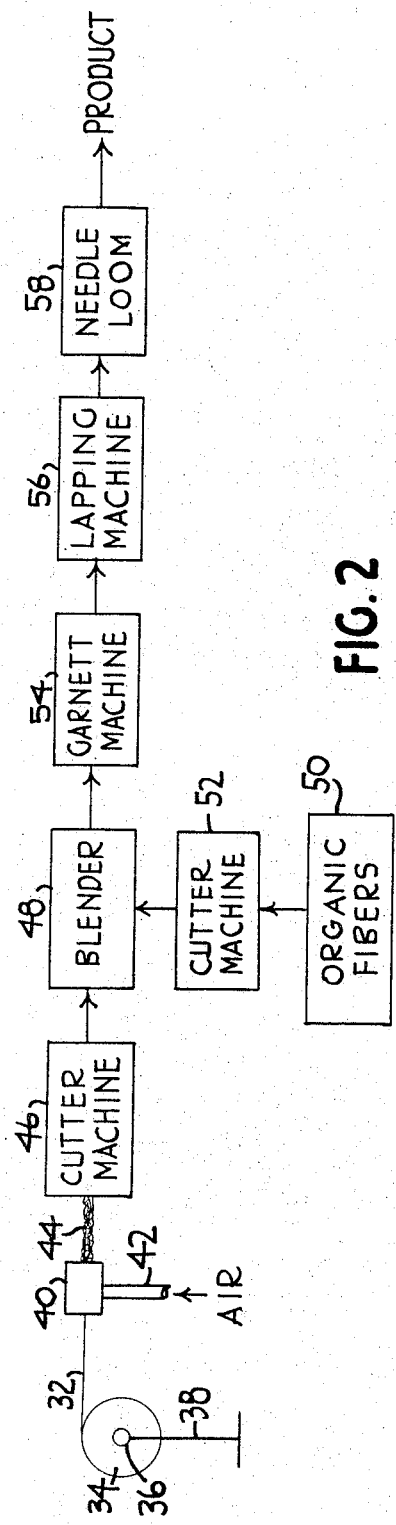
FIG. 2 is a schematic flow diagram of the process for making an improved fibrous mat of a blend of short segments of fibrous organic material and crimped, helically-shaped fiber glass filaments.

FIG. 2 schematically discloses a process for making a fibrous mat from a blend of organic fibers and crimped and deformed fiber glass filaments. As in FIG. 1, a crimped tow 32 is unwound from a package 34 positioned on a horizontal spindle 36 mounted on a support 38. The crimped tow is threaded through an air nozzle 40 to be expanded by air supplied thereto by conduit 42. The air expands the tow as previously described with reference to FIG. 1 and here, the expanded tow is designated by reference numeral 44. As in the previous description, air expansion is not always necessary and may be dispensed with.

The expanded tow 44 is introduced into a conventional cutter 46 where the expanded, cylindrical mass of deformed fiber glass filaments is severed into segments of preselected length as for example, 1 to 4 inches in length, it being understood that other lengths are usable in the process. The segments are fed from the cutter to a blender 48.

A source of organic fibers, such as thermoplastic or thermosetting synthetic material, i.e., rayon, polyurethane, polyester, olefin, modacrylic, fluorocarbon, acetate, nylon, acrylic, etc., or natural material, such as cotton or wool, is provided at 50. Mixtures of natural and synthetic organic fibers may be used. The organic fibers are fed to a cutter 52 where they are cut into similar length size after which they are blended with the glass fiber segments in a blender 48. The blended admixture is conveyed to a garnett machine 54 where a low density web of blended material is formed. The web of the blended segments is conveyed to a lapping machine 56 where the layers of web are positioned in lapping overlaying relation to each other.

The lapped webs of the blended material are fed to a needling loom 58 where barbed needles pass through the webs and draw filaments from one layer of the web through the adjacent layers to mechanically bond the webs together, much in the same manner as described with reference to FIG. 1.

The needled mat made of the blended fibers has good mechanical strength for handling. It is dimensionally stable. Those mats incorporating the synthetic organic fibers are especially useful for subsequent molding to a desired shape, as for example using dies, etc. When so used, they are given the proper heat treatment, depending upon the particular synthetic organic fiber used, so that the organic fiber softens and bonds the contiguous fibers one to another in the desired shape. They are useful for insulation purposes, but temperature limitations are dependent on the particular synthetic organic fiber used. Here, as in the mat of the FIG. 1 embodiment, no organic binder is applied to the mat to provide dimensional stability and mechanical strength. These attributes are built in by the needling operation.

Figure 3:
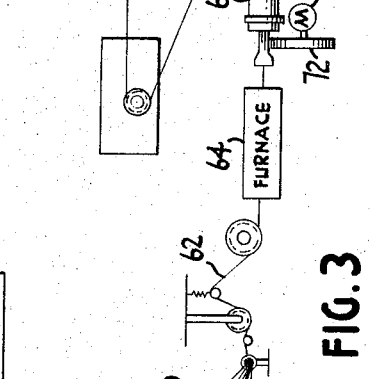
FIG. 3 is a schematic illustration of typical apparatus for permanently deforming a fiber glass tow for use in the process illustrated by the flow diagrams of FIGS. 1 and 2.
Figure 4:
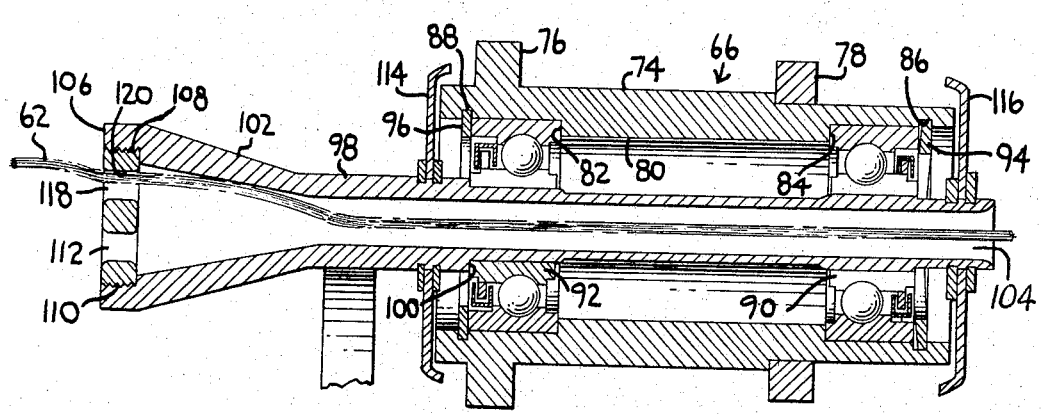
FIG. 4 is a sectional view of the false twist spindle of FIG. 3.

FIGS. 3 and 4 illustrate apparatus for producing the deformed, crimped tow of fiber glass filaments used in the processes described. Briefly, a plurality of strands of fiber glass are gathered as a tow and the tow is pulled through a furnace or heater and then through a false twist device. The false twist device imparts a twist in one direction to the portion of the tow in the furnace, so that the glass fibers are deformed by heat into a twisted configuration. The false twist device untwists the tow after the fibers have cooled sufficiently to a permanent crimped shape. In this process, the glass must be heated sufficiently to soften the glass. Any organic binder on the strands is thermally decomposed.

In FIG. 3, the process for crimping a fiber glass yarn is schematically represented. A plurality of untwisted fiber glass strands 60 are drawn from a suitable source and are gathered into a tow 62. The tow 62 is pulled through a furnace 64 and a false twist device, generally designated by the numeral 66, by means of the pulling force exerted by the take-up roll 68. Suitable pulleys, tension control mechanisms, twist stopping devices and the like are provided to control the tow 62 during the process. A motor 70 is arranged to drive a friction wheel 72 at a predetermined speed, which friction wheel 72 rotates the spindle portion of the false twister 66.

The false twister 66 has a tubular body 74 with external annular flange portions 76 and 78. The body portion is arranged to be rigidly secured to a support or standard and remains in a fixed position.

The body portion 74 has an axial bore or passageway 80 with spaced internal shoulders 82 and 84. The passageway 80 has a pair of annular recessed portions 86 and 88. Bearings 90 and 92 are positioned in the bore 80 in abutting relation with the respective shoulders 82 and 84 and snap rings 94 and 96, are positioned in the recessed portions 86 and 88 to maintain the bearings 90 and 92 in fixed portion within the body portion bore 80. Snap ring 94 is of bowed construction and serves as a spring to take up tolerances and to urge bearing 90 against the shoulder 84. The bearings are preferably of the type that are operable to rotate at high speeds, for example, between 75,000 r.p.m. and 150,000 r.p.m. and include suitable dust seals.

A tubular spindle 98 has an external intermediate shoulder portion 100 and an outwardly flared end portion 102. The spindle 98 is positioned coaxially within the tubular body portion 74 with the shoulder portion 100 abutting the inner race of bearing 92. The inner races of bearings 90 and 92 are lightly press-fitted onto the spindle 98 so that the spindle 98 is freely rotatable relative to the body portion 74.

The spindle 98 has an internal axial passageway or bore 104 that tapers outwardly with the flared end portion 102. Adjacent the spindle end wall 106, the passageway 104 has an internally threaded portion 108 which terminates at an inturned shoulder 110. An insert, designated as 112 is threadably secured in the bore 104 and about the inturned shoulder 110. Dust seal and shield discs 114 and 116 are secured to the spindle 98 for rotation therewith.

The insert 112 is disc-like in shape and has a peripheral threaded portion that mates with the thread 108 in the spindle bore 104. Thus when assembled, the insert 112 rotates with the spindle 98. The insert 112 has four equally spaced and radially extending slots 118 (only two of which are shown), so as to provide a balanced structure.

In operation the tow 62 is threaded through one of the slots 118 in the insert 112 and then through the bore 104 of the spindle 98. The spindle 98 is rotated at high speed. A centrifugal force is exerted on the tow 62 and it is urged against the peripheral end wall 120 as is illustrated. The portion of the tow passing through the insert 112 is continually urged against the slot radial end wall 120 and as the spindle rotates a twist is imparted thereto. The twisting of the tow 62 is caused by the radial displacement of the tow 62 relative to the axis of the spindle 98 and the axial rotation of the spindle.

It is to be understood that other crimping and false

We claim:

1. A process for producing fibrous mat comprising
   forming a tow composed of a plurality of longitudinally extending permanently crimped fiber glass strands that are free of organic binder and relatively movable with respect to one another, said strands consisting of filaments having a permanently distorted shape extending in a plurality of directions when said filaments are substantially free of tension and being intertwined and relatively movable with respect to one another,
   cutting said tow into segments of predetermined length,
   moving the thus segmented filaments with respect to one another to form a fibrous web, and
   interlocking permanently crimped portions of segments of said fiber glass filaments to produce a fibrous web having improved strength, improved resiliency, high bulk and low density.

2. A process as recited in claim 1 further including the steps of positioning a plurality of layers of said web in overlying relationship and interlocking said layers to each other to form a fibrous mat of improved strength, improved resiliency, high bulk and low density.

3. A process recited in claim 2 wherein said interlocked mat is free of organic binders.

4. A process as recited in claim 1 wherein said tow is subjected to an air stream prior to cutting and said tow is expanded to a high mass, low density cylindrical mass of distorted, intertwined glass fibers.

5. A process as recited in claim 1 further including the step of mixing organic fibers with said glass fibers before forming said web.

6. A process as recited in claim 5 wherein said organic fibers are selected from the group consisting of synthetic fibers, natural fibers and mixtures thereof.

7. A process as recited in claim 6 wherein said organic fibers comprise heat softenable fibers and said web is heat treated to soften at least a portion of said heat softenable organic fibers and cause them to adhere to said glass fibers.

8. A process as recited in claim 1 wherein said tow is formed by collecting a plurality of longitudinally extending fiber glass strands composed of filaments, crimping the strands of said tow, heating said crimped strands at a temperature sufficient to soften the filaments of said strands and to remove any organic binder present in said tow and cooling said softened filaments to impart permanent crimp in a plurality of directions.

9. A process as recited in claim 5 wherein said tow is formed by collecting a plurality of longitudinally extending fiber glass strands composed of filaments, crimping the strands of said tow, heating said crimped strands at a temperature sufficient to soften the filaments of said strands and to remove any organic binder present in said tow and cooling said softened filaments to impart permanent crimp in a plurality of directions.

10. A fiber glass mat comprising,
    a plurality of segments of fiber glass filaments that are free of organic binder and have a permanently distorted shape extending in a plurality of directions when said filaments are substantially free of tension,
    said fiber glass mat having segments of said fiber glass filaments that are substantially separated with respect to one another and other segments of said fiber glass filaments that have permanently crimped portions interlocked to one another to provide a fibrous mat having improved strength, improved resiliency, high bulk and low density.

11. A fiber glass mat according to claim 10 which further includes segments of organic fibers mixed with said glass fibers.

References Cited
UNITED STATES PATENTS

| | | | |
|---|---|---|---|
| 2,339,431 | 1/1944 | Slayter | 156—148 X |
| 2,500,282 | 3/1950 | Francis | 156—190 X |
| 2,794,759 | 6/1957 | Dildilian | 156—148 X |
| 2,797,529 | 7/1957 | Mohr et al. | 28—72 |
| 3,040,412 | 6/1962 | Russell | 28—72.2 |
| 3,099,594 | 7/1963 | Gaines et al. | 156—152 |
| 3,235,935 | 2/1966 | Daruwalla | 28—72.2 |
| 3,242,033 | 3/1966 | Dildilian et al. | 161—72 |

EARL M. BERGERT, *Primary Examiner.*

PHILLIP DIER, *Examiner.*